United States Patent
Allen et al.

(10) Patent No.: US 10,810,096 B2
(45) Date of Patent: *Oct. 20, 2020

(54) DEFERRED SERVER RECOVERY IN COMPUTING SYSTEMS

(71) Applicant: Microsoft Technology Licensing, LLC, Redmond, WA (US)

(72) Inventors: Nic Allen, Seattle, WA (US); Gaurav Jagtiani, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/984,608

(22) Filed: May 21, 2018

(65) Prior Publication Data
US 2018/0267872 A1  Sep. 20, 2018

Related U.S. Application Data

(63) Continuation of application No. 15/067,156, filed on Mar. 10, 2016, now Pat. No. 10,007,586.

(60) Provisional application No. 62/276,312, filed on Jan. 8, 2016.

(51) Int. Cl.
| G06F 11/00 | (2006.01) |
| G06F 11/20 | (2006.01) |
| G06F 9/48 | (2006.01) |
| G06F 11/07 | (2006.01) |
| G06F 11/14 | (2006.01) |
| G06F 11/30 | (2006.01) |

(52) U.S. Cl.
CPC ........ *G06F 11/2033* (2013.01); *G06F 9/4881* (2013.01); *G06F 11/0712* (2013.01); *G06F 11/0793* (2013.01); *G06F 11/1438* (2013.01); *G06F 11/301* (2013.01); *G06F 11/3031* (2013.01); *G06F 2201/805* (2013.01); *G06F 2201/81* (2013.01); *G06F 2201/815* (2013.01)

(58) Field of Classification Search
CPC .................................. G06F 9/48; G06F 9/5088
See application file for complete search history.

(56) References Cited

U.S. PATENT DOCUMENTS

| 8,495,261 B2* | 7/2013 | Rogers | G06F 13/24 370/216 |
| 9,218,246 B2* | 12/2015 | Nagesharao | G06F 11/2257 |
| 10,007,586 B2* | 6/2018 | Allen | G06F 9/4881 |
| 2011/0258488 A1* | 10/2011 | Nightingale | G06F 11/1658 714/15 |
| 2012/0331340 A1* | 12/2012 | Birkler | G06F 11/0703 714/15 |

(Continued)

*Primary Examiner* — Jonathan D Gibson
(74) *Attorney, Agent, or Firm* — Liang IP, PLLC

(57) ABSTRACT

Various techniques for deferred server recovery are disclosed herein. In one embodiment, a method includes receiving a notification of a fault from a host in the computing system. The host is performing one or more computing tasks for one or more users. The method can then include determining whether recovery of the fault in the received notification is deferrable on the host. In response to determining that the fault in the received notification is deferrable, the method includes setting a time delay to perform a pending recovery operation on the host at a later time and disallowing additional assignment of computing tasks to the host.

20 Claims, 7 Drawing Sheets

(56) References Cited

U.S. PATENT DOCUMENTS

| | | | |
|---|---|---|---|
| 2014/0108775 A1* | 4/2014 | Kludy | G06F 9/4405 713/2 |
| 2014/0281700 A1* | 9/2014 | Nagesharao | G06F 11/1415 714/15 |
| 2018/0267872 A1* | 9/2018 | Allen | G06F 9/4881 |

* cited by examiner

DEFERRED SERVER RECOVERY IN COMPUTING SYSTEMS

CROSS-REFERENCE TO RELATED APPLICATION(S)

This application is a continuation of U.S. patent application Ser. No. 15/067,156, filed Mar. 10, 2016, which is a non-provisional application of and claims priority to U.S. Provisional Application No. 62/276,312, filed on Jan. 8, 2016.

BACKGROUND

Datacenters providing cloud computing services typically include routers, switches, bridges, and other physical network devices that interconnect a large number of servers, network storage devices, and other types of physical computing devices via wired or wireless network links. The individual servers can host one or more virtual machines or other types of virtualized components accessible to cloud computing clients. The virtual machines can exchange messages such as emails via virtual networks in accordance with one or more network protocols supported by the physical network devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In cloud computing, virtual machine availability typically refers to an ability to create new virtual machines upon request or uninterrupted accessibility of existing virtual machines on a particular server. However, server outage events such as reboots, power cycles, system upgrades, etc. can result in system downtimes and decrease virtual machine availability. For instance, a user can often experience a downtime of five to even thirty minutes during a server reboot. In addition, state information (e.g., computation results, cached temporary data, etc.) in virtual machines hosted on the rebooted server may also be lost during a reboot, resulting in loss of data or work products.

Several embodiments of the disclosed technology are directed to increasing virtual machine availability and improving predictability of virtual machine downtime by deferring certain classes of server failures, faults, or issues. In certain embodiments, a controller (e.g., a datacenter manager) can monitor for and detect hardware and/or software failures, faults, or issues in advance of immediate recovery using, for instance, sensors, agents, or other suitable mechanisms. The controller can then determine whether the individual hardware/software failures, faults, or issues require immediate recovery or recovery can be deferred to a later date/time. An example of a deferrable hardware fault can be a control layer issue (e.g., unresponsive to remote control instructions) with a power distribution unit (PDU) or top-of-rack (TOR) router servicing a server. Such control layer issues typically do not prevent the PDU or TOR router from continuing to function, but can affect a later attempt to power-on/off or perform other operations. An example of a deferrable software fault can include a bug in an operating system or device driver manifesting as a "file-in-use" issue that prevents creation and/or deletion of virtual machines. A server reboot can typically mitigate or correct such an issue. However, a server reboot would also affect other virtual machines unaffected by the bug but hosted on the same server. The detected deferrable faults can be stored in a persistent computer readable memory on the server or persisted in another storage location and be associated with the particular server.

In response to determining that recovery of a detected fault can be deferred, the controller can designate a particular server corresponding to the detected fault as unavailable for hosting additional virtual machines. Upon designating the server as unavailable, the controller can also perform one or more of operations in preparation for an eventual recovery of the designated server. For example, in one embodiment, the controller can set a time delay at which the designated server can perform reboots, power cycles, hardware replacements, or other suitable types of recovery operations. The controller can also continue monitoring a number of virtual machines or other tasks being performed by the designated server. In response to detecting that the server is hosting no more virtual machines or other tasks, the controller can instruct the server to perform the scheduled recovery operation(s) irrespective of the set time delay. In further embodiments, the controller can also instruct the designated server to persist state information of all virtual machines currently hosted on the server. The state information can be persisted on the server itself, on a network storage device, on the controller, or in other suitable storage locations.

Several embodiments of the disclosed technology can increase uptime of servers and improve user experience when compared to conventional techniques. For example, as discussed above, instead of immediately performing recovery of a server upon detection of a failure, fault, or issue, the server can continue to operate until, for instance, a set time delay expires or the server is hosting no more virtual machines or other tasks. As such, a "file-in-use" issue that prevents deletion of one virtual machine would not result in rebooting the server and affect other virtual machines accessed or used by other users. Customer analysis has shown that most virtual machines have a short life span. For example, over 70% of virtual machines in Microsoft Azure® datacenters have a lifetime of 24 hours or less. Thus, deferring a server reboot by even 24 hours can significantly increase uptime and improving user experience for a large number of cloud computing clients.

Several embodiments of the disclosed technology can also increase predictability of server downtime when compared to conventional techniques. For example, by deferring recovery of a fault (e.g., file-in-use issue), the deferred recovery may be later on combined with other fault(s) or user-initiated operations (e.g., initiation of a new virtual machine) such that a user only experiences a single downtime event instead of multiple. In another example, the controller can provide notifications (e.g., prompts, emails, etc.) to users of virtual machines currently hosted on a server designated as unavailable to inform the users of pending reboots on the server. In response, the users can manage the upcoming downtime by, for instance, replicating local data to a remote location, moving tasks to other virtual machines, scheduling a system/application upgrade to coincide with the pending reboot, or performing other suitable operations. As such, predictability and efficiencies of managing virtual machine downtime can be improved over conventional techniques.

DETAILED DESCRIPTION

Figure 1:
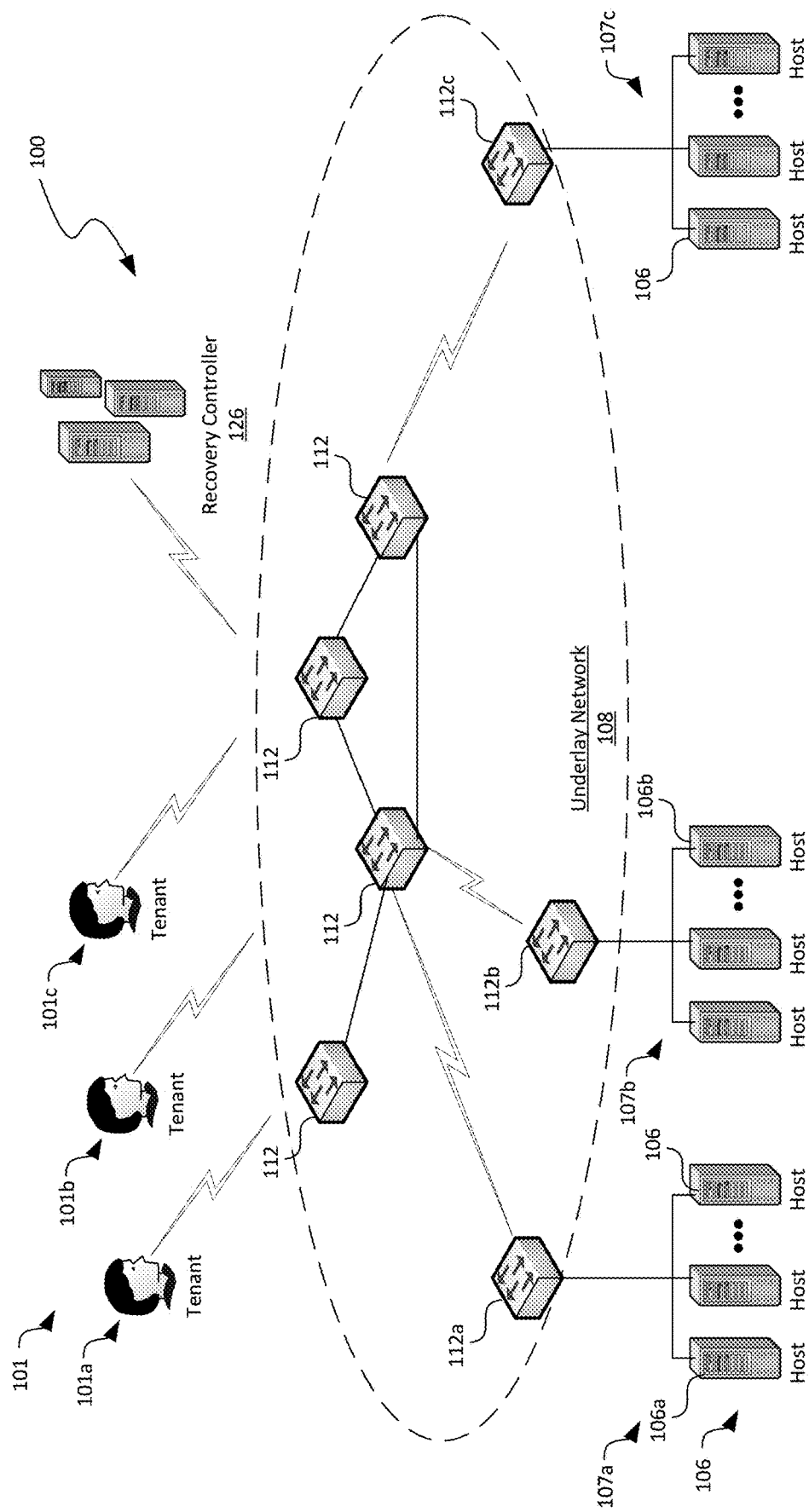
FIG. 1 is a schematic diagram illustrating a computing network having deferred server recovery in accordance with embodiments of the disclosed technology.

Certain embodiments of systems, devices, components, modules, routines, data structures, and processes for deferred server recovery in datacenters or other suitable computing networks are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-8.

As used herein, the term "computing network" generally refers to an interconnected computer network having a plurality of network nodes that connect a plurality of servers or hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtualized computing devices or components, or other suitable functionalities. For example, a host can include a server having a hypervisor configured to support one or more virtual machines or other suitable virtual components.

A computing network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

In cloud computing, virtual machine availability is a priority for satisfying user experiences. Sever reboots and/or other repairs are often necessary to recover from unexpected failures, faults, or issues of servers. However, such recovery can have a severe impact on virtual machine availability and result in significant downtime. Several embodiments of the disclosed technology can address at least some of the foregoing drawbacks by deferring server recovery for certain types or classes of hardware and software failures, faults, or issues (collectively referred to as "deferrable issues").

In certain embodiments, servers associated with deferrable issues can be designated as "pending deferred recovery" or "unavailable," and further allocations of virtual machines to these servers can be disallowed. As such, no additional virtual machines can be deployed on these servers. Meanwhile, any existing virtual machines already hosted on the unavailable servers can continue to operate until termination by, for instance, corresponding users. In other embodiments, programmatic notifications can be given to affected users of the existing virtual machines. The notifications can notify the affected users of, for example, the deferred issue and a scheduled point in time for performing server recovery operations. The servers associated with deferrable issues can then be recovered by, for example, rebooting at the scheduled point in time or an input from the affected users or an administrator via, for example, an application program interface. Additional embodiments of the disclosed technology are described in more detail below with reference to FIGS. 1-8.

FIG. 1 is a schematic diagram illustrating a computing network 100 having deferred server recovery in accordance with embodiments of the disclosed technology. As shown in FIG. 1, the computing network 100 can include an underlay network 108 interconnecting a plurality of hosts 106, a plurality of tenants 101, and a recovery controller 126. Even though particular components of the computing network 100 are shown in FIG. 1, in other embodiments, the computing network 100 can also include additional and/or different components. For example, in certain embodiments, the computing network 100 can also include network storage devices, maintenance managers, and/or other suitable components (not shown).

As shown in FIG. 1, the underlay network 108 can include one or more network nodes 112 that interconnect the multiple hosts 106, the tenants 101, and the recovery controller 126. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to a corresponding network nodes 112a-112c, respectively, which are commonly referred to as "top-of-rack" or "TOR" network nodes. The TOR network nodes 112a-112c can then be operatively coupled to additional network nodes 112 to form a computer network in a hierarchical, flat, mesh, or other suitable types of topology that allows communication between hosts 106, the recovery controller 126, and the tenants 101. In other embodiments, multiple host sets 107a-107c may share a single network node 112.

The hosts 106 can individually be configured to provide computing, storage, and/or other suitable cloud computing services to the tenants 101. For example, as described in more detail below with reference to FIG. 2, one of the hosts 106 can initiate and maintain one or more virtual machines 144 (shown in FIG. 2) upon requests from the tenants 101. The tenants 101 can then utilize the initiated virtual machines 144 to perform computation, communication, and/or other suitable tasks. In certain embodiments, one of the hosts 106 can provide virtual machines 144 for multiple tenants 101. For example, the host 106' can host three virtual machines 144 individually corresponding to each of the tenants 101a-101b. During operation, the first tenant 101a can encounter an issue (e.g., a file-in-use issue), which can be recovered if the host 106' is rebooted. However, the second and third tenants 101b and 101c may not experience the same file-in-use issue. As such, if the host 106' is rebooted immediately, all first, second, and third tenants 101a-101c would experience a downtime event, and thus negatively impact user experiences.

In accordance with several embodiments of the disclosed technology, the recovery controller 126 can be configured to manage recovery of the hosts 106 upon detection of such deferrable issues. In certain embodiments, the recovery controller 126 can include a standalone server, desktop computer, laptop computer, or other suitable types of computing device operatively coupled to the underlay network 108. In other embodiments, the recovery controller 126 can be implemented as one or more network services executing on and provided by, for example, one or more of the hosts 106 or another server (not shown). Example components of the recovery controller 126 are described in more detail below with reference to FIG. 3.

Figure 2:
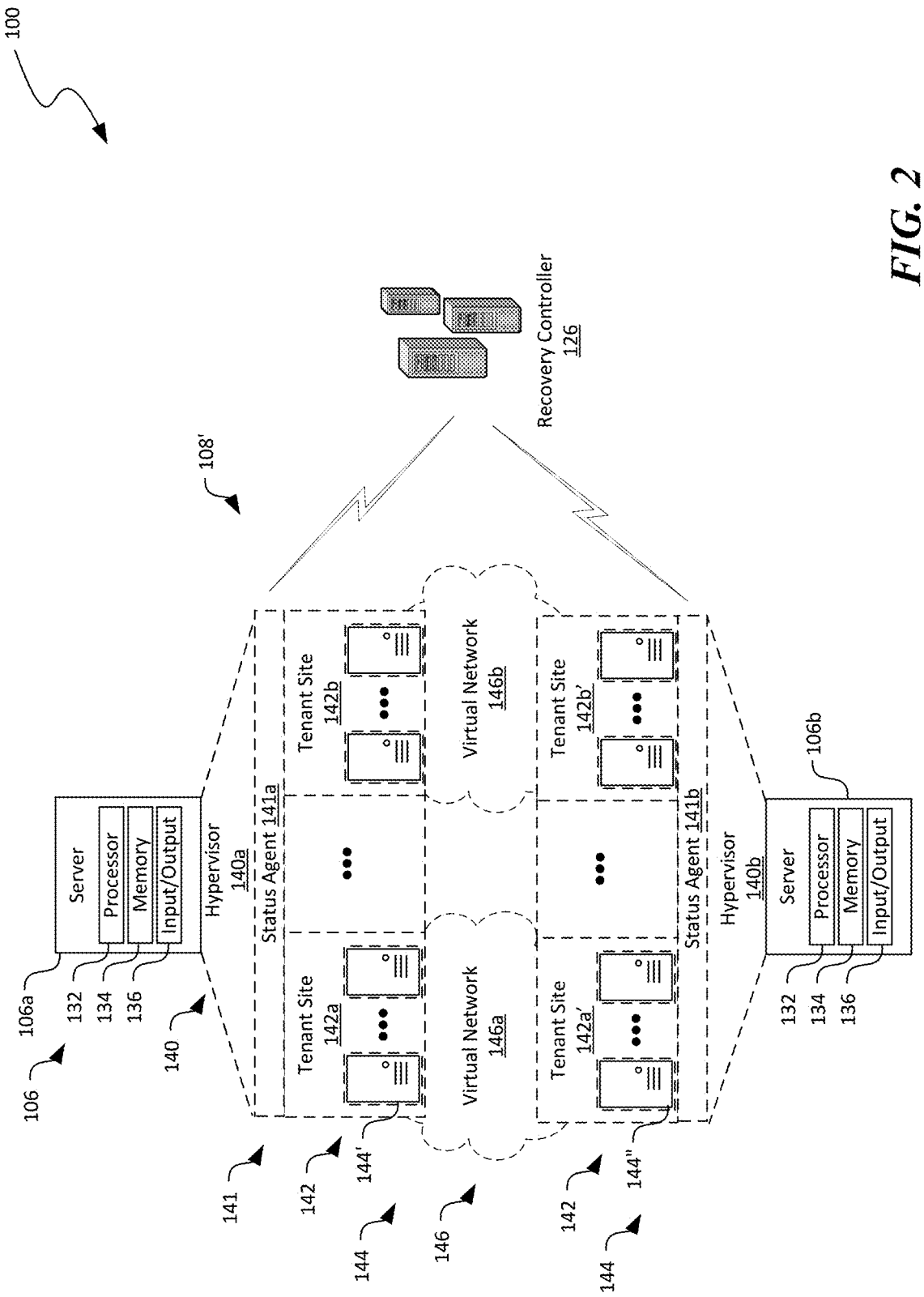
FIG. 2 is a schematic diagram illustrating certain hardware/software components of the computing network of FIG. 1 in accordance with embodiments of the disclosed technology.

FIG. 2 is a schematic diagram illustrating an overlay network 108' implemented on the underlay network 108 of FIG. 1 in accordance with embodiments of the disclosed technology. In FIG. 2, only certain components of the underlay network 108 of FIG. 1 are shown for clarity. As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4-7). The input/output component 136 can include a display, a touch screen, a keyboard, a mouse, a printer, and/or other suitable types of input/output devices configured to accept input from and provide output to an operator and/or an automated software controller (not shown).

The first and second hosts 106a and 106b can individually contain instructions in the memory 134 executable by the processors 132, cause the individual processors 132 to provide a hypervisor 140 (identified individually as first and second hypervisors 140a and 140b) and a status agent 141 (identified individually as first and second status agent 141a and 141b). Even though the hypervisor 140 and the status agent 141 are shown as separate components, in other embodiments, the status agent 141 can be a part of the hypervisor 140 or an operating system (not shown) executing on the corresponding host 106. In further embodiments, the status agent 141 can be a standalone application.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or applications.

Also shown in FIG. 2, the computing network 100 can include an overlay network 108' having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

The status agent 141 can be configured to provide notifications of hardware and/or software faults, failures, or issues to the recovery controller 126. The status agent 141 can also provide an operational status of the hosts 106 to the recovery controller 126. For example, in certain embodiments, the status agent 141 can provide a number of active virtual machines 144 currently hosted on a particular host 106 to the recovery controller 126. In other embodiments, the status agent 141 can also provide CPU utilization, storage capacity, and/or other suitable operating parameters of the host 106 to the recovery controller 126. Even though the status agent 141 is shown in FIG. 2 as a component of the hosts 106, in other embodiments, the network nodes 112 (FIG. 1) and/or other suitable components of the computing network 100 can also individually include a status agent generally similar to those on the hosts 106.

Figure 3:
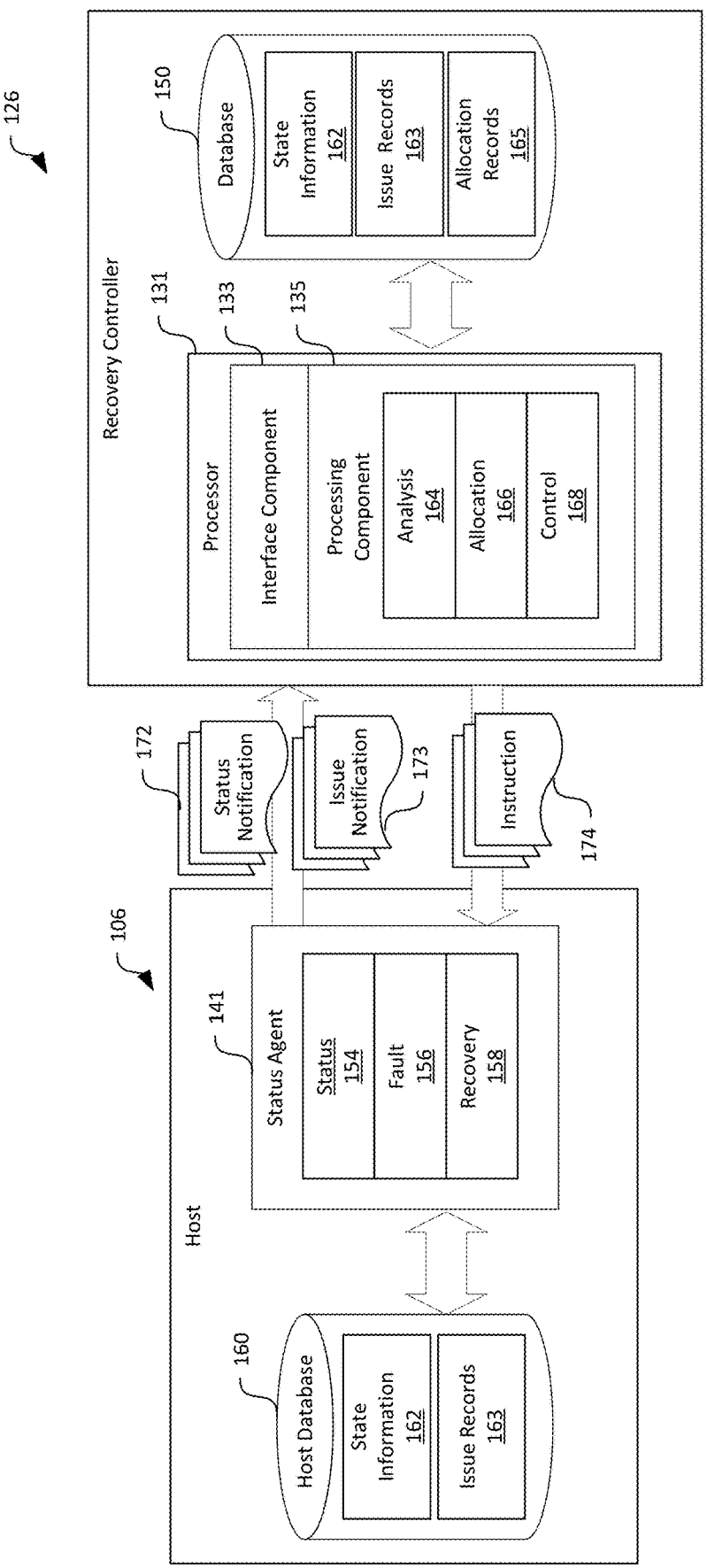
FIG. 3 is a block diagram illustrating hardware/software components of a controller suitable for the computing network of FIG. 1 in accordance with embodiments of the disclosed technology.

FIG. 3 is a block diagram illustrating certain hardware/software components of a recovery controller suitable for the computing network 100 shown in FIGS. 1 and 2 in accordance with embodiments of the disclosed technology. In FIG. 3 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the host 106 (e.g., the first host 106a or second host 106b of FIG. 1) can include a status agent 141 operatively coupled to a host database 160 containing records of state information 162 and issue records 163. The state information 162 can contain data of computation values, operating parameters, or other suitable information associated with the virtual machines 144 (FIG. 2). For instance, the state information 162 can include an accumulated value of a counter associated with a virtual machine 144 and configured to count a total number of words in a document. In certain embodiments, the state information 162 can be temporarily stored in a cache (not shown) on the host 106. In other embodiments, the state information 162 can be stored in a persistent memory (not shown) on the host 106.

The issue records 163 can individually contain data regarding a detected failure, fault, or issue (collectively referred to as "issue") of the host 106 by the status agent 141. For example, in one embodiment, an issue record 163 can contain data indicating that a virtual machine 144 on the host 106 encounters a file-in-use issue when the hypervisor 107 (FIG. 2) attempts to delete the virtual machine 144. In other embodiments, the issue records 163 can also contain data records of other suitable hardware/software issues. In certain embodiments, the issue records 163 can be temporarily stored in a cache on the host 106. In other embodiments, the issue records 163 can be stored in a persistent memory (not shown) on the host 106.

As shown in FIG. 3, the status agent 141 can include a status module 154, a fault module 156, and a recovery module 158 operatively coupled to one another. Even though the status agent 141 is shown in FIG. 3 as having the foregoing modules, in other embodiments, at least one of the foregoing modules can be a part of other hardware/software components of the host 106. For instance, in certain embodiments, the recovery module 158 can be a part of an operating system (not shown) or the hypervisor 107 (FIG. 2) on the host 106. In other embodiments, the recovery module 158 may be a standalone application. In further embodiments, the status agent 141 can also include input, output, or other suitable types of modules.

The status module 154 can be configured to monitor for and transmit status 172 of the host 106 to the recovery controller 126 via, for instance, the overlay network 108' of FIG. 2 and the underlay network 108 of FIG. 1. In certain embodiments, the status module 154 can include one or more hardware components such as, for instance, thermocouples configured to measure an operating temperature of the host 106. In other embodiments, the status module 154 can include one or more software sensors such as, for instance, a counter configured to monitor a number of virtual machines 144 currently hosted by the host 106. In further embodiments, the status module 154 can include a combination of the foregoing hardware and software components.

The fault module 156 can be configured to monitor for and transmit detected issues 173 to the recovery controller 126. In certain embodiments, the fault module 156 can include a passive interface configured to receive notifications of issues as the issues arise. In other embodiments, the fault module 156 can also include active components configured to proactively probe internal and/or peripheral components of the host 106. For example, the fault module 156 can be configured to transmit a probing signal to, for instance, a corresponding TOR network node 112. If a target response is not received from the TOR network node 112, the fault module 156 can indicate that an issue is present with the TOR network node 112. In further embodiments, the fault module 156 can include a combination of the passive interface and active components.

The recovery module 158 can be configured to receive an instruction 174 from the recovery controller 126. In one embodiment, the instruction 174 can include data representing an accumulated timer value expiration of which would result in initiation of a reboot or other suitable types of recovery operation on the host 106. In response to such an instruction 174, the recovery module 158 can be configured to instantiate a timer with the accumulated timer value and initiate a countdown (or count up) of the timer. In another embodiment, the instruction 174 can include data representing a command to immediately initiate a reboot or performance of other suitable types of recovery operation. In response, the recovery module 158 can cause the host 106 to reboot by, for instance, transmitting a reboot command to the operating system of the host 106. In further embodiments, the recovery module 158 can also be configured to perform a timer reset, a timer adjustment, or other suitable operations in response to a corresponding instruction 174.

As shown in FIG. 3, the recovery controller 126 can include a processor 131 operatively coupled to a database 150 containing records of state information 162, issue records 163, and allocation records 165. The state information 162 and issue records 163 can be generally similar to those described above with reference to the host 106 except having an indication of an associated host 106. The allocation records 165 can contain data representing one or more of (i) a number of virtual machines 144 allocated to the individual hosts 106; (ii) a number of hosts 106 that are designated as unavailable for accepting additional allocation of virtual machines 144; or (iii) a remaining capacity for allocating additional virtual machines 144 in the computing network 100 (or a subdivision thereof).

Also shown in FIG. 3, the processor 131 can execute instructions to provide an interface component 133 and a processing component 135. The interface component 133 can be configured to receive the status 172 and issues 173 from and transmit the instruction 174 to the host 106. The interface component 133 can also be configured to cause the received issues 173 as issue records 173 in the database 150. In certain embodiments, the interface component 133 can include a network interface driver. In other embodiments, the interface component 133 can also include an application programming interface and/or other suitable components.

The processing component 135 can be configured to manage deferred recovery of the host 106 based on the received status notification 172 and/or the issue notification 173. As shown in FIG. 3, the processing component 135 can include an analysis module 164, an allocation module 166, and a control module 168 operatively coupled to one another. The analysis module 164 can be configured to determine if a received issue notification 173 is related to a deferrable issue or requires an immediate recovery operation. In one embodiment, the analysis module 164 can determine an issue is deferrable based on a set of rules provided by, for instance, an administrator. In other embodiments, the analysis module 164 can determine whether an issue is deferrable based on administrator input or other suitable criteria. Example embodiments of analyzing the issue are described in more detail below with reference to FIG. 5.

The allocation module 166 can be configured to designate a host 106 as unavailable for further allocation of virtual machines in response to a determination by the analysis module 164 that the issue notification 173 is related to a deferrable issue. The allocation module 166 can also be configured to update the allocation records 165 regarding the unavailability designation and/or to update a currently available capacity in the computing network 100 (or a subdivision thereof) based on the unavailability designation.

In certain embodiments, the allocation module 166 can be configured to determine whether a currently available capacity in the computing network 100 (or a subdivision thereof) is below an administrator selected threshold. In response to determining that the currently available capacity is below the threshold, the allocation module 166 can prevent designating the host 106 as unavailable even when the issue is a deferrable issue. Instead, in one embodiment, the allocation module 166 can cause the control module 168 to generate a command for immediate performance of recovery operation to the host 106. In another embodiment, the allocation module 166 can designate the host 106 as available but only when certain capacity (e.g., 85%, 90%, 95%, or other suitable percentages) in the computing network 100 (or a subdivision thereof) has been exhausted.

The control module 168 is configured to generate and cause the interface component 133 to transmit one or more instructions 174 to the host 106. Upon designation of the host 106 as unavailable, the control module 168 can perform one or more of the following:

Computing a date/time at which a reboot or performance of other suitable types of recovery operation is to be initiated on the host 106;

Generating a command to persist current state information 162 on the host 106;

Generating a command to persist the received issue 173 as an issue record 163 on the host 106; or Generating a command to retrieve current state information 162 from the host 106 and persistently store the retrieved state information 162 in the database 150 on the recovery controller.

In certain embodiments, computing the date/time can take into account other scheduled maintenance operations, for instance, a scheduled date/time for an upcoming hardware and/or software upgrade on the host 106).

In other embodiments, computing the date/time (or time delay) can take into account a previously scheduled maintenance repair, an unplanned downtime event on the host 106 or other suitable information. In further embodiments, computing the date/time can also be based on a relative priority level of the tenants 101 (FIG. 1). For example, when the issue is associated with the first tenant 101a (FIG. 1) with a higher priority level than the second tenant 101b (FIG. 1), the computed date/time can have a longer delay than if the issue is associated with the second tenant 101b. On the other hand, if the first tenant 101a has a lower priority level than the second tenant 101b, the computed date/time can then include the same or a shorter delay than if the issue is associated with the second tenant 101b. The priority levels of the tenants 101 can be based on subscription levels or other suitable criteria. In yet further embodiments, computing the date/time can also be based on a capacity, utilization rate, or virtual machine turnover rate in the computing system in addition to or in lieu of the scheduled maintenance, unplanned downtime event, user priority levels or other suitable parameters.

On the other hand, if the analysis module 164 determines that the issue requires an immediate recovery operation (e.g., a reboot), the control module 168 can generate and transmit a command to the host 106 to immediately initiate a reboot or other suitable types of recovery operation. Though not shown in FIG. 3, the interface component 131 can also be configured to receive an input from, for example, an administrator to manually cause the control module 168 to generate and transmit the command to immediately initiate a reboot or other suitable types of recovery operation.

In operation, the fault module 156 of the status agent 141 can continuously, periodically, or in other suitable manners monitor for any issues with operations of the host 106. In response to a detected issue, the fault module 156 can generate and transmit an issue notification 173 to the recovery controller 126. Upon reception, the interface component 133 of the recovery controller 126 conveys the issue notification 173 to the processing component 135 and optionally stores the received issue notification 173 in the database 150.

The analysis module 164 of the processing component 135 can then determine whether the received issue notification 173 is related to a deferrable issue based on, for example, a set of administrator provided rules. In response to a determination that the received issue notification 173 is related to a deferrable issue, in certain embodiments, the allocation module 166 can designate the host 106 as unavailable for further allocation of virtual machines 144. The allocation module 166 can also cause the control module 168 to generate an instruction 174 containing data regarding a delayed timer (e.g., an accumulated time value) expiration of which would cause the host 106 to perform a reboot or other suitable types of recovery operation.

In certain embodiments, the status module 154 of the status agent 141 can also monitor for operating status of the host 106 and transmit a status notification 172 to the recovery controller 126. In certain embodiments, the status notification 172 can include data indicating a number of virtual machines 144 currently hosted on the host 106. The analysis module 164 can then determine whether the number of virtual machines 144 currently hosted on the host 106 is below a threshold (e.g., two, one, or zero). In response to determining that the number of virtual machines 144 currently hosted on the host 106 is below the threshold, the analysis module 164 can indicate to the allocation module 166 that the host 106 is ready for immediate performance of recovery operation. In response, the allocation module 166 can cause the control module 168 to generate another instruction 174 to command the host 106 to immediately initiate a reboot or performance of other suitable types of recovery operation.

Figure 4:
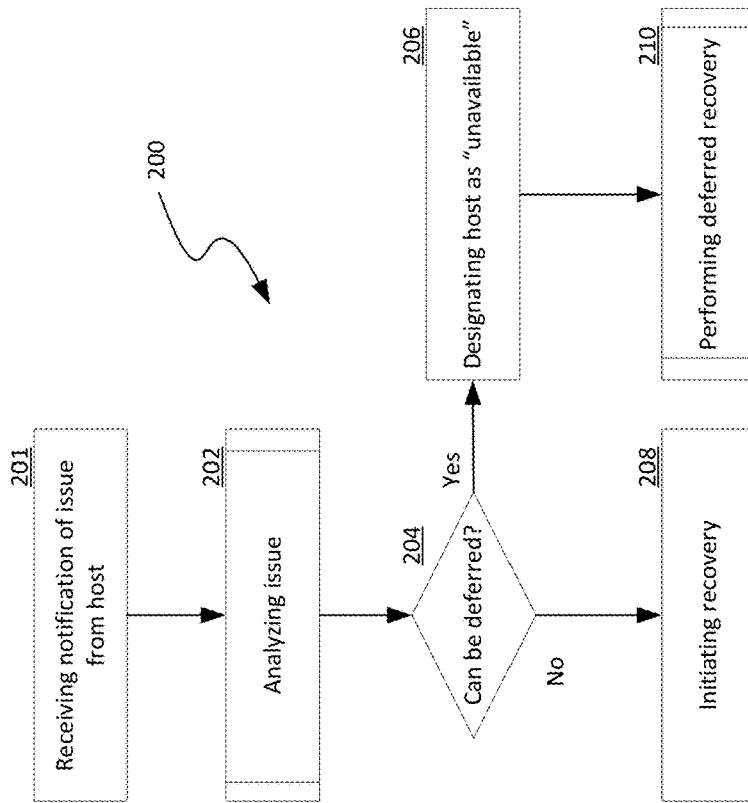
FIG. 4 is a flowchart illustrating a process of deferring server recovery in accordance with embodiments of the disclosed technology.

FIG. 4 is a flowchart illustrating a process 200 of deferring server recovery in accordance with embodiments of the disclosed technology. Even though the process 200 is described in relation to the computing system 100 of FIGS. 1 and 2 and the hardware/software components of FIG. 3, in other embodiments, the process 200 can also be implemented in other suitable systems. As shown in FIG. 4, the process 200 includes receiving a notification of operating issue from a host 106 (FIG. 1) at stage 201. The process 200 can also include analyzing the operating issue to determine whether the operating issue is a deferrable issue at stage 202. In certain embodiments, analyzing the operating issue can be based on a set of rules identifying which issue or which category of issues can be deferred. In other embodiments, the foregoing analysis can be based on administrator input or other suitable criteria. Example embodiments of analyzing the operating issue are described in more detail below with reference to FIG. 5.

At stage 204, in response to determining that the operating issue can be deferred, the process 200 can include designating the host as "unavailable" at stage 206 and performing deferred recovery at stage 210. Example embodiments of performing deferred recovery of the host are described in more detail below with reference to FIG. 6. Otherwise, the process 200 can include initiating an immediate recovery of the host at stage 208.

Figure 5:
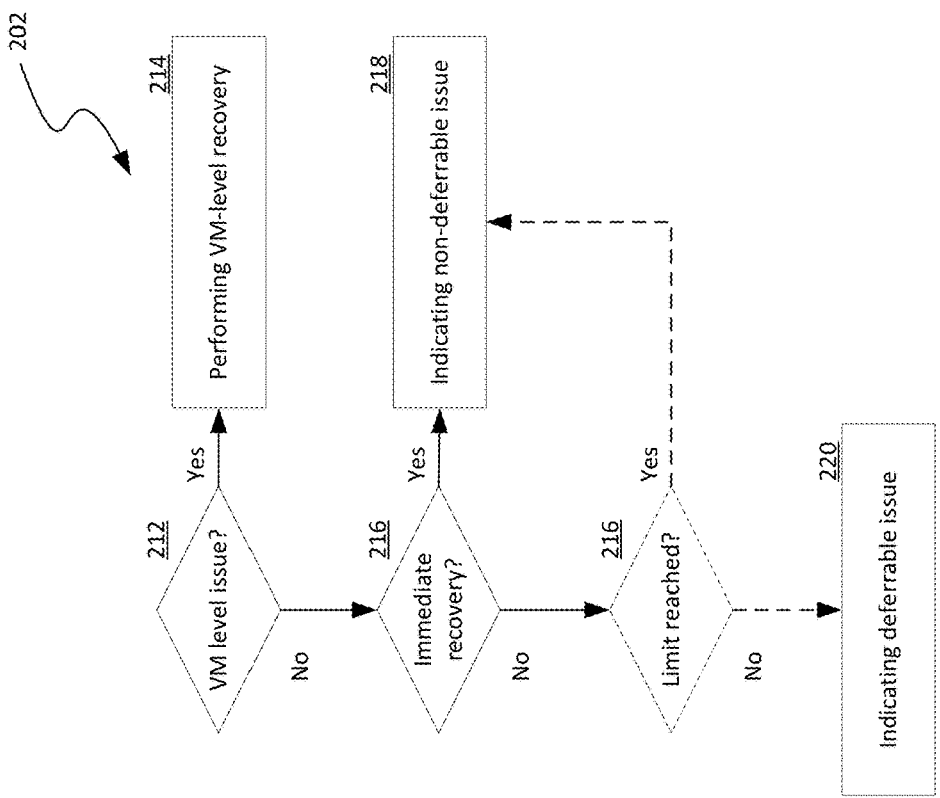
FIG. 5 is a flowchart illustrating a process of analyzing device faults in accordance with embodiments of the disclosed technology.

FIG. 5 is a flowchart illustrating a process of analyzing operating issues in accordance with embodiments of the disclosed technology. As shown in FIG. 5, the process 202 can include a decision stage 212 to determine whether the operating issue is a virtual machine level issue. In response to determining that the operating issue is a virtual machine level issue, the process 202 can include causing the host to perform a virtual machine level recovery operation such as, for instance, terminating an existing virtual machine, initiating a new virtual machine, and/or other suitable operations. In response to determining that the operating issue is not a virtual machine level issue, the process 202 can include another decision stage 216 to determine whether immediate recovery of the host is warranted. In one embodiment, immediate recovery of the host is warranted when the operating issue substantially impairs basic functions of the host. For instance, the host has suffered a physical memory fault. In other embodiments, immediate recovery of the host can be warranted based on a set of administrator provided rules or other suitable criteria.

In response to determining that immediate recovery of the host is warranted, the process 202 can include indicating non-deferrable issue at stage 218. In response to determining that immediate recovery of the host is not warranted, the process 202 can optionally include a further decision stage 216 to determine whether a limit for designating unavailable hosts is reached. In one embodiment, the limit for designating unavailable hosts can be based on an available capacity of the computing network 100 (FIG. 1). In other embodiments, the limit for designating unavailable hosts can be based on a percentage of utilization or other suitable parameters of the computing network 100. In response to determining that the limit for designating unavailable hosts is reached, the process 202 can revert to indicating a non-deferrable issue at stage 218. Otherwise, the process 202 can include indicating a deferrable issue at stage 220.

Figure 6:
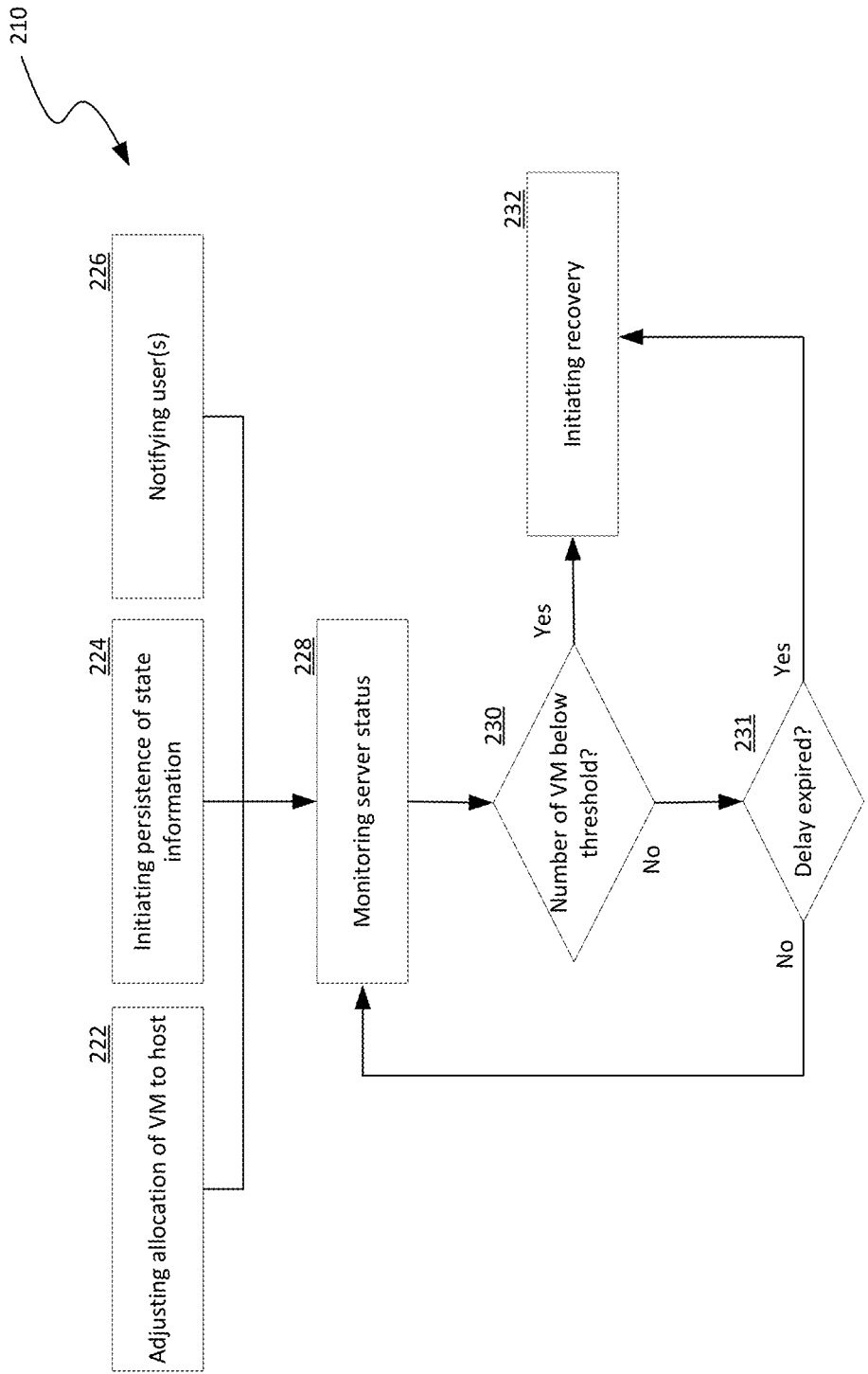
FIG. 6 is a flowchart illustrating a process of performing deferred recovery in accordance with embodiments of the disclosed technology.

FIG. 6 is a flowchart illustrating a process 210 of performing deferred recovery in accordance with embodiments of the disclosed technology. As shown in FIG. 6, the process 210 can include performing one or more of adjusting allocation of virtual machine to the host at stage 222, initiating persistence of state information at stage 224, or notifying users of the virtual machines on the host at stage 226. In one embodiment, adjusting allocation of virtual machines can include preventing further allocation of virtual machines to the host and set a delayed timer for performing a recovery operation. In other embodiments, the host can be associated with a low allocation class such that further virtual machines are not allocated to the host until, for example, an available capacity of the computing network falls below a preset threshold.

In certain embodiments, initiating persistence of state information can include causing the host to persistently store the state information on the host. In other embodiments, initiating persistence of state information can include retrieving state information from the host and persistently storing the state information on the recovery controller 126 (FIG. 1) or other suitable storage locations. In one embodiment, notifying the users can include sending emails to the users who are currently utilizing the virtual machines hosted on the host. In other embodiments, notifying the users can also include utilizing desktop notifications, simple text messages, or other suitable messaging techniques.

The process 210 can also include monitoring for a server status at stage 228. The server status can include a current number of virtual machines, CPU utilization, memory usage, and/or other suitable parameters. The process 210 can then include a decision stage 230 to determine whether a number of virtual machines hosted by the host is below a preset threshold (e.g., two, one, or zero). In response to determining that the number of virtual machines hosted by the host is below the preset threshold, the process 210 includes causing the host to initiate immediate recovery at stage 232 irrespective of the expiration of the delayed timer. Otherwise, the process 210 includes another decision stage 231 to determine whether the set delayed timer has expired. In response to determining that the set delayed timer has expired, the process 210 proceeds to initiate immediate recovery at stage 232; otherwise, the process 210 reverts to monitoring for a server status at stage 228.

Figure 7:
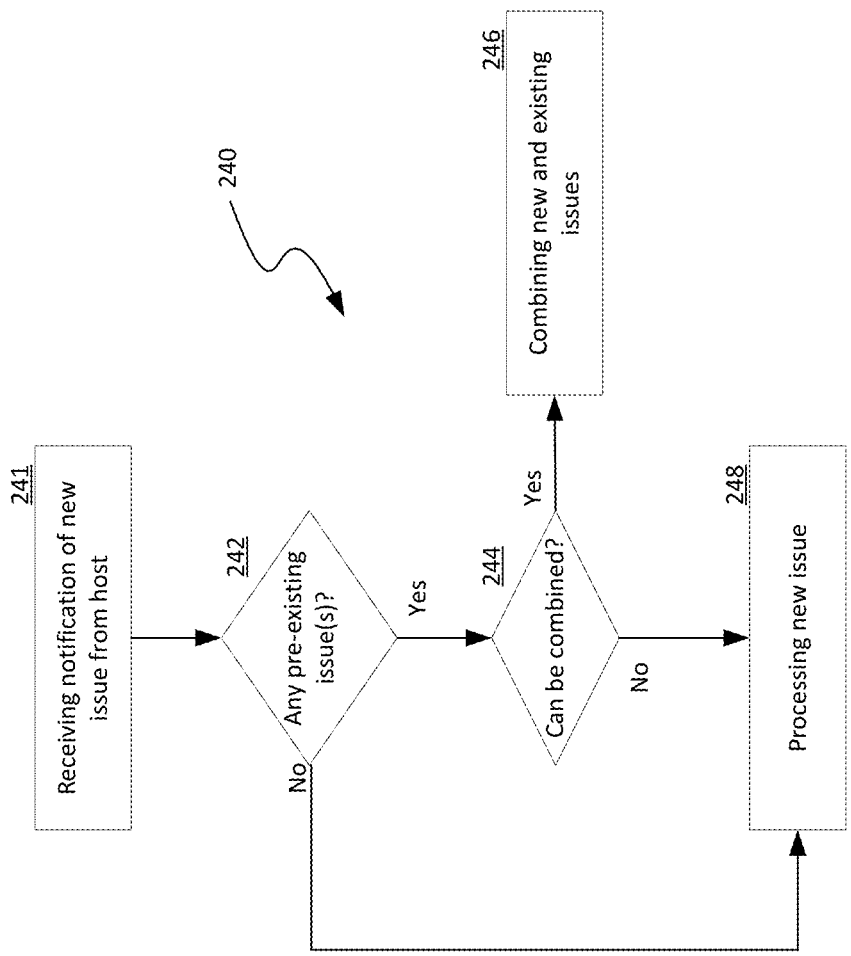
FIG. 7 is a flowchart illustrating a process of combining deferred recovery in accordance with embodiments of the disclosed technology.

FIG. 7 is a flowchart illustrating a process 240 of combining deferred recovery in accordance with embodiments of the disclosed technology. As shown in FIG. 7, the process 240 can include receiving a notification of a new issue from a host at stage 241. The process 240 can then include a decision stage 242 to determine whether the host is associated with one or more pre-existing issues or scheduled maintenance operations (collectively referred to as "existing issues"). In response to determining that the host is associated with one or more existing issues, the process 240 can include another decision stage 244 to determine whether the new issue can be combined with any existing issues.

In certain embodiments, the new issue can be combined with an existing issue when a single recovery operation can mitigate or at least partially address the new issue and the existing issue. For example, the new issue (e.g., a file-in-use issue) and the existing issue (e.g., an operating system upgrade) can both require a reboot. Other example combinable existing issues can include, inter alia, planned or unplanned hardware maintenance, hardware failures, power outages, operating system crashes, user updates (e.g., resizing a virtual machine) that result in deletion and recreation of virtual machines.

In other embodiments, the new and existing issues can be assigned a priority or precedence, for example, based on corresponding recovery operations. For instance, an issue (e.g., a hardware issue requiring manipulation of memory, processor, or other hardware components of a host) that requires an invasive hardware repair and long downtime can be assigned a higher priority level than another issue (e.g., a software issue) that only requires a reboot. Thus, in one case, if the new issue has a higher priority level than the existing issue, the new issue can replace the existing issue. In another case, if the new issue has a lower priority level than the existing issue, then the new issue can be subsumed by the existing issue requiring the more expensive recovery operation. In further embodiments, the new issue can be combined with an existing issue based on administrator input or other suitable criteria.

In response to determining that the new issue can be combined with an existing issue, the process 240 includes combining the new and existing issues at stage 246, by, for example, setting a delayed timer for both the new and existing issues. In response to determining that the new issue cannot be combined with an existing issue, the process 240 includes processing the new issue at stage 248, example embodiments of which are described in more detail above with reference to FIGS. 4-6.

Figure 8:
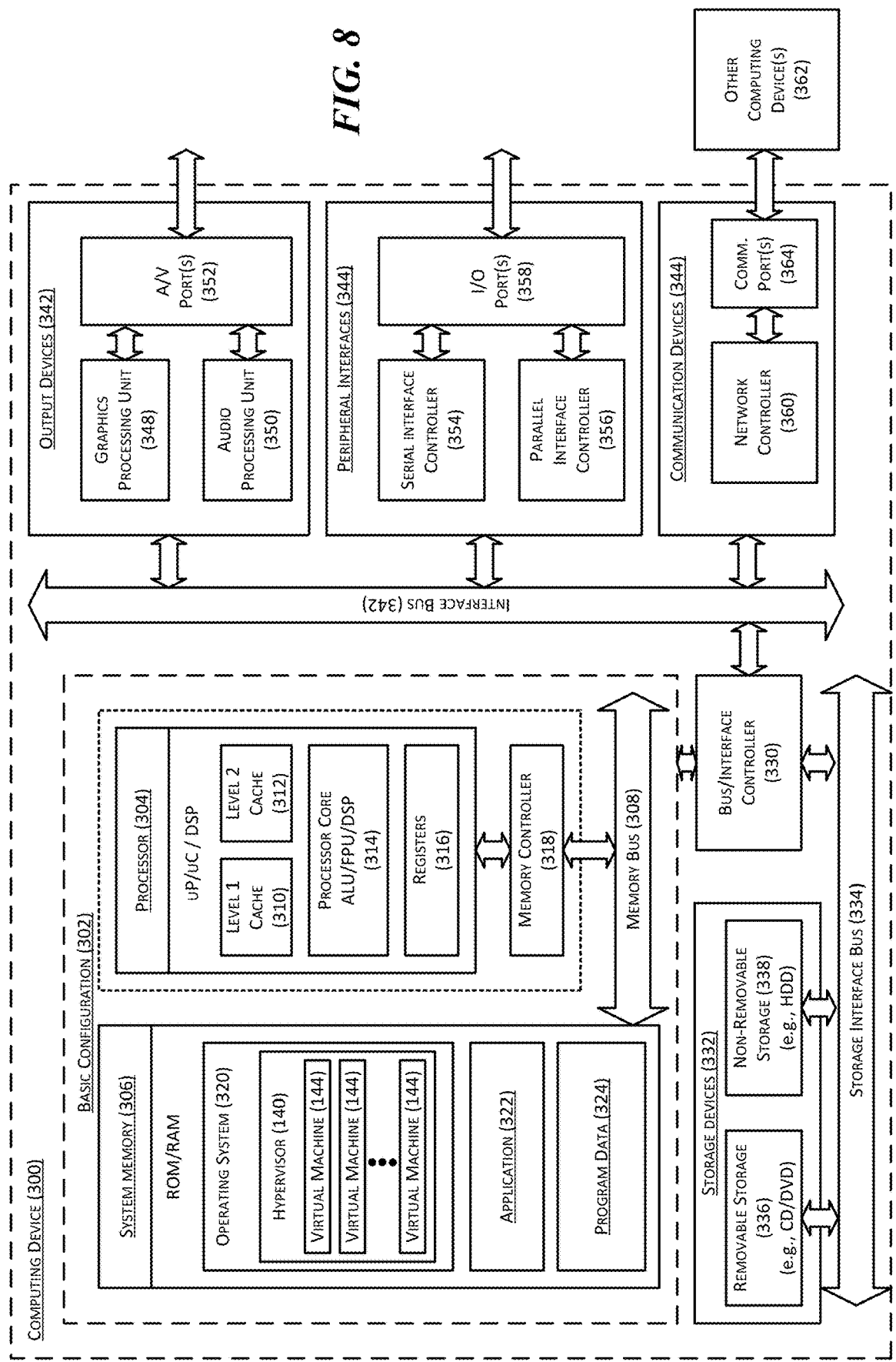
FIG. 8 is a computing device suitable for certain components of the computing network in FIG. 1.

FIG. 8 is a computing device 300 suitable for certain components of the computing network 100 in FIG. 1. For example, the computing device 300 can be suitable for the hosts 106 or the label server 126 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed by a computing device in a computing system having a plurality of hosts interconnected by a computer network, comprising:
   receiving a notification of a fault from a host in the computing system, the host currently executing one or more computing tasks to provide a computing service for a user;
   in response to receiving the notification, determining whether recovery of the fault in the received notification is deferrable on the host, wherein recovery of the fault is deferrable when the host can continue to provide the computing service to the user by executing the one or more computing tasks currently being executed by the host despite of the fault in the received notification; and
   in response to determining that the fault in the received notification is deferrable,
      setting a time delay to perform a recovery operation on the host at a later time; and
      disallowing assignments of additional computing tasks to the host.

2. The method of claim 1, further comprising in response to determining that the fault in the received notification is deferrable, transmitting an instruction to the host to persistently store state information related to the one or more computing tasks currently performed by the host.

3. The method of claim 1, further comprising in response to determining that the fault in the received notification is not deferrable, transmitting an instruction to the host for performing a recovery operation on the host immediately.

4. The method of claim 1, further comprising subsequent to setting the time delay, notifying user of the pending recovery operation and the set time delay, receiving an input from the users and initiating immediate recovery of the host based on the received input when the set time delay is not expired.

5. The method of claim 1, further comprising:
   determining whether the set time delay to perform the pending recovery operation on the host at the later time is expired; and
   in response to determining that the set time delay is expired, transmitting an instruction to the host for performing the pending recovery operation on the host.

6. The method of claim 1, further comprising:
   monitoring a number of the computing tasks the host is currently performing; and
   in response to determining that the host is currently not performing any computing tasks, transmitting an instruction for performing the pending recovery operation on the host even though the set time delay is not expired.

7. The method of claim 1, further comprising:
   in response to determining that the fault in the received notification is deferrable,
      determining whether a total number of hosts having pending recovery operations exceeds a threshold; and
      in response to the total number of hosts having pending recovery operations does not exceed the threshold,
         setting the time delay to perform the pending recovery operation on the host at a later time; and
         disallowing additional assignment of computing tasks to the host.

8. The method of claim 1, further comprising:
   in response to determining that the fault in the received notification is deferrable,
      determining whether a total number of hosts having pending recovery operations exceeds a threshold; and
      in response to the total number of hosts having pending recovery operations exceeds the threshold, transmitting an instruction to the host for performing a recovery operation on the host immediately.

9. The method of claim 7 or 8, further comprising:
   determining the threshold by:
      setting the threshold with a static value based on a user input, or
      dynamically calculating the threshold based on one or more of a capacity or utilization rate of the computing system.

10. The method of claim 1 wherein:
    the notification of the fault is a first notification of a first fault;
    the method further includes:
       receiving a second notification of a second fault, a notification of an unplanned downtime event, or a planned maintenance event from the host in the computing system;
       determining whether recovery of the first fault is combinable with recovery of the second fault, the unplanned downtime event, or the planned maintenance event; and
       in response to determining that recovery of the first fault is combinable with recovery of the second fault, the unplanned downtime event, or the planned maintenance event, performing recovery of the first fault with recovery of the second fault, the unplanned downtime event, or the planned maintenance event.

11. The method of claim 1 wherein setting the time delay includes setting the time delay to a pre-determined value or calculating the time delay based on one or more of a capacity, utilization rate, or virtual machine turnover rate in the computing system.

12. The method of claim 1 wherein setting the time delay includes calculating the time delay based on a priority of a user associated with the detected fault.

13. A computing device interconnected to a plurality of hosts by a computer network in a computing system, the computing device comprising:
a processor; and
a memory operatively coupled to the processor, the memory containing instructions executable by the processor to cause the computing device to:
receive a notification of a fault from one of a host in the computing system, the host currently executing computing tasks to provide a computing service for a user;
determine whether immediate recovery of the fault in the received notification on the host is needed, wherein immediate recovery of the fault is not needed when the host can continue to provide the computing service to the user by executing the computing tasks currently being executed by the host despite of the fault in the received notification; and
in response to determining that immediate recovery of the fault in the received notification is not needed,
set a time delay to perform a recovery operation of the fault on the host at a later time; and
disallow assignments of additional computing tasks to the host.

14. The computing device of claim 13 wherein the memory includes additional instructions executable by the processor to cause the computing device to, in response to determining that immediate recovery of the fault in the received notification is not needed, transmit an instruction to the host to persistently store state information related to the one or more computing tasks currently performed by the host.

15. The computing device of claim 13 wherein the memory includes additional instructions executable by the processor to cause the computing device to, in response to determining that immediate recovery of the fault in the received notification is needed, transmit an instruction to the host for performing a recovery operation on the host immediately.

16. The computing device of claim 13 wherein the memory includes additional instructions executable by the processor to cause the computing device to:
subsequent to setting the time delay,
notify user of the pending recovery operation and the set time delay;
receive an input from the user allowing immediate recovery of the host; and
initiate immediate recovery of the host based on the received input even when the set time delay is not expired.

17. The computing device of claim 13 wherein the memory includes additional instructions executable by the processor to cause the computing device to:
determine whether the set time delay to perform the pending recovery operation on the host at the later time is expired; and
in response to determining that the set time delay is expired, transmit an instruction to the host for performing the pending recovery operation on the host.

18. The computing device of claim 13 wherein the memory includes additional instructions executable by the processor to cause the computing device to:
monitor a number of the computing tasks the host is currently performing; and
in response to determining that the host is currently not performing any computing tasks, transmit an instruction for performing the pending recovery operation on the host even though the set time delay is not expired.

19. A method performed by a computing device in a computing system having a plurality of hosts interconnected by a computer network, comprising:
receiving a notification of a fault from a host in the computing system, the host currently executing one or more computing tasks to provide a computing service for a remote user; and
in response to the received notification of the fault from the host,
determining whether the host can continue to provide the computing service to the remote user by executing the one or more computing tasks currently being executed by the host despite of the fault in the received notification; and
in response to determining that the host can continue providing the computing service despite of the fault in the received notification,
delaying a recovery operation on the host to a later time, the recovery operation being configured to at least mitigate the fault in the received notification from the host; and
preventing assigning additional computing tasks to the host from which the notification of the fault is received.

20. The method of claim 19 wherein:
the notification of the fault is a first notification of a first fault;
the method further includes:
receiving a second notification of a second fault, a notification of an unplanned downtime event, or a planned maintenance event from the host in the computing system;
determining whether recovery of the first fault is combinable with recovery of the second fault, the unplanned downtime event, or the planned maintenance event; and
in response to determining that recovery of the first fault is combinable with recovery of the second fault, the unplanned downtime event, or the planned maintenance event, performing recovery of the first fault with recovery of the second fault, the unplanned downtime event, or the planned maintenance event.

* * * * *